A. VAN HAAGEN.

Assignor to H. C. BUTCHER.

Filtering Apparatus.

No. 8,192. Reissued April 23, 1878.

Witnesses
Henry Howson, Jr.
Harry Smith

Inventor
Anthony Van Haagen
by his Attorneys
Howson and Sons

UNITED STATES PATENT OFFICE.

ANTHONY VAN HAAGEN, OF PHILADELPHIA, PENNSYLVANIA, ASSIGNOR TO HENRY C. BUTCHER, OF SAME PLACE.

IMPROVEMENT IN FILTERING APPARATUS.

Specification forming part of Letters Patent No. 200,363, dated February 12, 1878; Reissue No. 8,192, dated April 23, 1878; application filed March 11, 1878.

*To all whom it may concern:*

Be it known that I, ANTHONY VAN HAAGEN, of Philadelphia, Pennsylvania, have invented a new and useful Improvement in Filtering Apparatus, of which the following is a specification:

The object of my invention is to construct a filter in which the close packing of the filtering medium is prevented, the running of channels in the said medium obviated, and its maintenance at such a heat assured that the apparatus can be employed with the best results for the rapid filtering of tallow and other fatty and oily matter.

Figure 1:
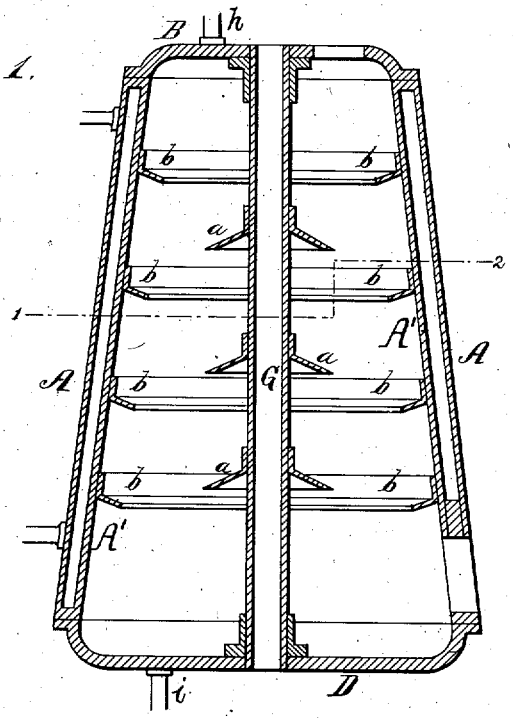
Figure 2:
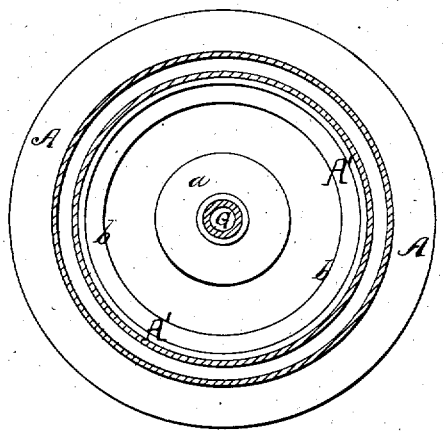

In the accompanying drawing, Figure 1 is a vertical section of my improved filter, and Fig. 2 a sectional plan on the line 1 2.

In the operation of filtering apparatus, more or less difficulty has been experienced, owing to the packing of the charcoal and other filtering medium so tightly as to prevent the free percolation through it of the material to be filtered, and this has been especially the case in filtering oily and fatty matter.

Another difficulty in filtering such matter has been its maintenance in a proper fluid condition, in order to enable it to pass through the filtering-bed; and a third difficulty has resulted from the tendency of the material to be filtered to force channels through the filtering medium, by which channels the material is apt to escape in an unfiltered condition.

I overcome these difficulties in a manner which I will now proceed to describe.

The filtering vessel has double walls A A′, and an intervening space, through which steam is caused to circulate.

From the cover B to the base D extends a central tube, G, through which, also, steam is caused to circulate, and from which flanges *a* project at suitable intervals, annular flanges *b* being also secured to the inner wall A′ of the casing.

In filtering fatty and oily matter it is essential that it, as well as the filtering medium, should be maintained at a proper degree of heat, and for this purpose vessels with steam-jackets have been used; but the heat derived from this source did not penetrate far enough into the mass of filtering material unless the vessels were made inconveniently small, and even in this case the oily and fatty matter would make channels nearest the casing, where the filtering material was hottest.

Attempts have also been made to overcome these difficulties by introducing steam into the vessel; but this also had the effect of cutting channels in the filtering material.

By combining in the filtering vessel a steam-jacket in the outer casing with the central steam-chamber G, the mass of filtering material must be maintained at a proper degree of heat throughout, and this is assured by the presence of the flanges *a* and *b*, which serve to conduct the heat of the jacket and central chamber into the body of filtering material. These flanges serve other useful purposes. While they do not interfere with the proper percolation of the material to be filtered through the mass of filtering material, they prevent the formation of channels through the same; and they also serve to partly suspend the filtering material within the vessel, and prevent it from being packed too closely at the bottom. This is also prevented by the tapering form of the filtering vessel, which is larger in diameter below than above, so that such of the filtering material as descends has a larger space to occupy than it had above, and hence will not be packed too tightly below.

The central steam-chamber and flanges may be combined with a cylindrical filtering vessel, or with a vessel of other shape; but I prefer in all cases to use the tapering vessel, smaller above than below.

For smaller filters the central steam-chamber may be dispensed with; but in this case the internal flanges *b* should be retained.

There is a suitable pipe, *h*, in the top B of the vessel for the introduction of the material to be filtered, and a suitable outlet, *i*, at the bottom D. There are also man-holes at suitable points, for gaining access to the interior of the vessel.

Without claiming, broadly, the internal projections on the casing of a filter,

I claim as my invention—

1. A filtering-vessel in which a steam-jacket formed on the outer casing is combined with projections on the interior of the said casing for conducting heat derived from the jacket to the filtering material, all substantially as set forth.

2. A filtering-vessel in which an exterior casing, having internal projections, is combined with a central steam-chamber.

3. A filtering vessel having a central tube with flanges or projections, as set forth, for the purpose specified.

4. The combination, in a filtering vessel, of an outer casing, provided with a steam-jacket and internal flanges or projections, with a central chamber, provided with flanges or projections, as described.

In testimony whereof I have signed my name to this specification in the presence of two subscribing witnesses.

ANTHONY VAN HAAGEN.

Witnesses:
HARRY A. CRAWFORD,
HARRY SMITH.